(12) United States Patent
Hu et al.

(10) Patent No.: US 7,250,146 B2
(45) Date of Patent: Jul. 31, 2007

(54) METHOD FOR PRODUCING A REVERSIBLE HYDROGEN STORAGE MEDIUM WITH HIGH STORAGE CAPACITY AND ULTRAFAST KINETICS

(75) Inventors: Yun Hang Hu, Williamsville, NY (US); Eli Ruckenstein, Amherst, NY (US)

(73) Assignee: The Research Foundation of State University of New York, Amherst, NY (US)

( * ) Notice: Subject to any disclaimer, the term of this patent is extended or adjusted under 35 U.S.C. 154(b) by 226 days.

(21) Appl. No.: 11/057,437

(22) Filed: Feb. 14, 2005

(65) Prior Publication Data

US 2005/0226804 A1   Oct. 13, 2005

Related U.S. Application Data

(60) Provisional application No. 60/544,392, filed on Feb. 13, 2004, provisional application No. 60/626,377, filed on Nov. 9, 2004.

(51) Int. Cl.
*C01B 21/06* (2006.01)

(52) U.S. Cl. .................... 423/409; 423/413; 423/648.1
(58) Field of Classification Search ................ 423/409, 423/646, 658.2, 413, 648.1
See application file for complete search history.

(56) References Cited

U.S. PATENT DOCUMENTS

| | | | |
|---|---|---|---|
| 2,866,685 | A | 12/1958 | Lam et al. |
| 2,910,347 | A | 10/1959 | Esmay |
| 4,234,554 | A | 11/1980 | Rabenau et al. |
| 4,321,163 | A | 3/1982 | Wahl et al. |
| 4,396,589 | A | 8/1983 | Bogdanovic |

OTHER PUBLICATIONS

Ping Chen et al, "Interaction of hydrogen with metal nitrides and imides", NATURE, vol. 420, Nov. 21, 2002, pp. 302-304.*

* cited by examiner

*Primary Examiner*—Wayne A. Langel
(74) *Attorney, Agent, or Firm*—Hodgson Russ LLP

(57) ABSTRACT

A method is provided for the preparation of a hydrogen storage medium having a high hydrogen storage capacity, high reversibility and fast reaction time. A high storage capacity $Li_3N$-containing media with high reversibility is also provided.

20 Claims, 5 Drawing Sheets

METHOD FOR PRODUCING A REVERSIBLE HYDROGEN STORAGE MEDIUM WITH HIGH STORAGE CAPACITY AND ULTRAFAST KINETICS

This application claims priority to U.S. provisional application No. 60/544,392 filed on Feb. 13, 2004 and U.S. provisional application No. 60/626,377 filed on Nov. 9, 2004 the disclosures of which are incorporated herein by reference.

BACKGROUND OF THE INVENTION

A low-cost hydrogen storage technology that provides a high storage capacity and fast kinetics is a critical factor in the development of a hydrogen economy for transportation. The solid-state storage is now considered as the safest and most effective way of routinely handling hydrogen(1,2), and the attention is focused on metal hydrides(3), complex hydrides(4-7), nano-tubes and fibers(8-16), micro-porous metal-organic materials(17), and lithium nitride(18-21). A hydrogen storage technology which can economically carry enough hydrogen on-board of a vehicle to enable a 300-mile vehicle range is critical to make the hydrogen-powered automobiles competitive with the traditional vehicles. Furthermore, the DOE mid-term target for on-board hydrogen storage material is 6 wt % reversible hydrogen capacity with fast kinetics. At the present time, no existing hydrogen storage material meets this target.

As early as 1910, Dafert and Miklauz reported that $Li_3N$ can absorb 10.4 wt % hydrogen to form $Li_3NH_4$ (22) ($Li_3N+2H_2=Li_3NH_4$) and the $Li_3NH_4$ can decompose to release hydrogen. Furthermore, Ruff and Goeres reported that $Li_3NH_4$ is a mixture of $LiNH_2$ and $2LiH$ (23). Therefore, $Li_3N$ can be a useful storage material. However, it did not attract attention for about a century probably because of the suspicion that it can generate $NH_3$, which, indeed, is a thermodynamically favorable process at temperatures below 400° C. (18a). However, recent experiments showed that no $NH_3$ could be detected during the hydrogenation of $Li_3N$ and the dehydrogenation of hydrogenated $Li_3N$ (18, 21). Furthermore, recent experiments demonstrated that an ultra-fast reaction between $NH_3$ and $LiH$ enables $LiH$ to capture the entire $NH_3$ generated during hydrogenation and dehydrogenation (18a,19). Thus, $Li_3N$ has recently started to attract attention as a material for hydrogen storage(18-21). However, a critical issue is that its reversible hydrogen capacity is less than 5.5 wt %. This occurs because $LiNH_2$ and $2LiH$, which are the products of $Li_3N$ hydrogenation, dehydrogenate in two steps: $LiH+LiNH_2=Li_2NH+H_2$ and $LiH+Li_2NH=Li_3N+H_2$. The first step, which provides about 5.5 wt % hydrogen capacity, takes place easily even at temperatures below 200° C., whereas the second step requires high temperatures (>400° C.). Furthermore, it has been found that $Li_3N$ undergoes the binding of hydrogen at such a rate that the heat released in the binding reaction causes hot spots in the solid, resulting in sintering of the solid and a corresponding decrease in its hydrogen capacity, reversibility, and thus its usefulness as a storage medium. A stable hydrogen storage medium which has a high storage capacity and a high reversibility would be a significant advance in the storage of hydrogen, particularly for use in portable hydrogen fuel cells.

SUMMARY OF THE INVENTION

The present invention provides a method for increasing the reversible hydrogen storage capacity of a solid comprising $Li_3N$. Also provided are materials having increased hydrogen storage capacity produced by the method. The method comprises forming lithium oxide ($Li_2O$) at the surface of the solid such that the $Li_2O$ partially covers the surface, followed by subjecting the partially oxidized solid to a prehydrogenation/dehydrogenation step. This method yields a solid which has a highly reversible hydrogen capacity. Materials having greater hydrogen storage capacities than currently available materials can be formed by the method.

In one embodiment, when performing the method of the invention, if $LiNH_2$ is added to the solid prior to the hydrogenation step, the resulting solid has an unexpectedly high reversible hydrogen capacity of 6.8 wt %.

DETAILED DESCRIPTION OF THE INVENTION

Figure 1:
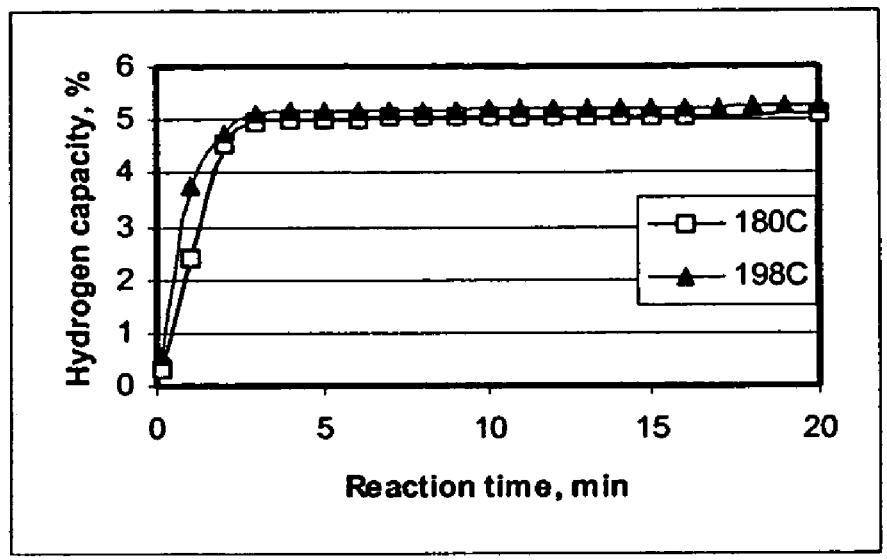
FIG. 1. The hydrogen absorption in Li—N—O. Conditions: initial pressure 7 atm and final pressure 4 atm, $Li_3N$=0.25 g.

The present invention provides a stable hydrogen storage medium with a high hydrogen storage capacity and reversibility. Also provided is a method for making such a medium. The method comprises the steps of 1) forming lithium oxide on the surface of a solid comprising $Li_3N$, either through an oxidation step or some other means; and 2) subjecting the solid to hydrogenation, followed by dehydrogenation. The first step is referred to as the "oxidation" step.

Without desiring to be bound by theory it is thought that the partial oxidation and prehydrogenation-dehydrogenation treatments are important for the following reason: The hydrogenation of $Li_3N$ ($Li_3N+H_2=Li_2NH+LiH$, $\Delta H=-116$ kJ/mol) is a highly exothermic reaction with fast kinetics, which leads to the generation of hot spots and sintering of the $Li_3N$ material, reducing its suitability as a reversible hydrogen storage medium. However, when a part of the $Li_3$ surface is oxidized to $Li_2O$ (for example, by being transformed into LiOH in air at room temperature and decomposed into $Li_2O$ in vacuum at a higher temperature), $Li_2O$ covers many of the surface active sites of $Li_3N$. One effect of the subsequent prehydrogenation-dehydrogenation pretreatment is the diffusion of $Li_2O$, initially distributed at the surfaces of the solid, into the bulk of the sample. The dispersed $Li_2O$ also plays the role of a stabilizer. Another effect of prehydrogenation-dehydrogenation is the conversion of $Li_3N$ into $Li_2NH$. The hydrogen absorption of the hydrogenation-dehydrogenation pretreated sample is provided by the reaction ($Li_2NH+H_2=LiNH_2+LiH$, $\Delta H=-45$ kJ/mol), which has a much lower reaction heat (−45 kJ/mol) than the hydrogenation of $Li_3N$ (−116 kJ/mol). The combination of the lower reaction heat and the dispersion of $Li_2O$ prevents the pretreated material from sintering during the hydrogen absorption.

The $Li_3N$ solid of the present invention can be prepared and used in a range of solid forms such as powdered, granular, monolith, etc. However, powdered, granular and other particulate forms are preferred as they have a high ratio of surface area to volume. Preferred are particulate forms which include particle sizes with diameters in the range of from 1 nm to 10 mm. In one embodiment, the particulate forms include particles with sizes in the range of from 10 μm to 1 mm.

If a particulate form is desired, the $Li_3N$ solid of the present invention can be prepared by grinding with a mortar and pestle, or by other processes which produce particulate $Li_3N$.

The $Li_3N$ is subjected to conditions such that $Li_2O$ forms in or on the surface layer of the solid. If particulate $Li_3N$ is desired, partial or full oxidation can be performed during the particulating process. An example is the formation of particles by grinding, in the presence of air which contains $H_2O$. In one embodiment, such a process results in the surface formation of LiOH. The LiOH can be further decomposed to into $Li_2O$ in a subsequent step, such as subjecting the ground solid to a vacuum in the range of from $1\times10^{-6}$ to 1 Pa, at temperatures in the range of from 50° C. to 400° C. In one embodiment, the vacuum is in the range of from $1\times10^{-5}$ to $1\times10^{-3}$ Pa, and the temperature is in the range of from 100° C. to 300° C. In general, the $Li_2O$ is present in the surface layer in a distribution which is similar to the distribution of the LiOH which is decomposed to obtain the $Li_2O$. It is preferred that the $Li_2O$ be present in an amount between 0.1 and 20 wt % of the solid.

The $Li_2O$-bearing solid $Li_3N$ is then subjected to a prehydrogenation step in which it is hydrogenated at least partially to capacity. By "partially to capacity," it is meant that the solid has the ability to bind additional hydrogen. The term "prehydrogenation" as used herein refers to the first hydrogenation following the oxidation step. Preferably, the prehydrogenation is conducted at a hydrogen pressure or partial pressure in the range of from 0.1 atm to 100 atm, a temperature in the range of from 50° C. to 400° C. for a time in the range of from 0.5 to 48 hours. In a preferred embodiment, the solid is prehydrogenated at a hydrogen pressure or partial pressure in the range of from 5 atm to 20 atm, a temperature in the range of from 100° C. to 300° C., for a time in the range of from 10 to 24 hours and is prehydrogenated to capacity. In general, the hydrogen capacity of the solid formed by the method of the present invention is highest if the solid is prehydrogenated to capacity. The solid is preferably prehydrogenated to at least 50% of its hydrogen capacity, and more preferably prehydrogenated to at least 80% of its hydrogen capacity. In one embodiment, the solid is hydrogenated to 100% of its hydrogen capacity.

The solid is then at least partially dehydrogenated. Preferably, the solid is dehydrogenated at a pressure in the range of from $1\times10^{-6}$ to $1\times10^5$ Pa, a temperature in the range of from 5° C. to 400° C., and a time in the range of from 0.5 to 48 hours. In one embodiment, the solid is dehydrogenated at a pressure in the range of from $1\times10^{-2}$ to $1\times10^3$ Pa, a temperature in the range of from 100° C. to 300° C., and a time in the range of from 10 to 24 hours. By dehydrogenating "at least partially," it is meant that after dehydrogenating, the medium still contains hydrogen which can be removed through further dehydrogenation.

It should be noted that oxidizing the solid surface such that it is completely occluded by $Li_2O$ can compromise the ability to carry out the prehydrogenation step. It is thus preferred that the $Li_2O$ cover at most 90% of the surface area of the solid.

The addition of $LiNH_2$ in the solid prior to oxidation ("preaddition" of $LiNH_2$) has been found to increase the hydrogen capacity of the solid relative to $Li_3N$ solids which do not contain pre-added $LiNH_2$. The effect is not lost with successive hydrogenation/dehydrogenation, steps. Without desiring to be bound by theory, the addition of $LiNH_2$ to the solid prior to hydrogenation is thought to act as follows. The mole ratio of $LiNH_2/LiH$ of hydrogenated $Li_3N$ which is free of pre-added $LiNH_2$ is around 0.5, and consequently only about half of the LiH in the sample can release hydrogen via the first of the dehydrogenation steps elucidated in the Background section, above (LiH+ $LiNH_2=Li_2NH+H_2$) at sufficiently low temperatures. In contrast, through the addition of $LiNH_2$ to $Li_3N$ prior to hydrogenation, the $LiNH_2/LiH$ ratio is raised such that all or nearly all of the LiH generated by the hydrogenation of $Li_3N$ can release hydrogen via the first step. The percentage of reversibly bound hydrogen (at sufficiently low temperatures) is thus increased. Based on such a material design idea, various $LiNH_2/Li_3N$ mixture materials have been identified, which can provide a reversible hydrogen capacity of 6.8 wt % or even higher.

It is preferable that pre-added $LiNH_2$ comprise at most 90 mol % of the solid. However, when $LiNH_2$ is used in proportions which are less than about 55 mol %, the hydrogen capacity of the resulting solid is unexpectedly high.

For example, at 28 mol % $LiNH_2$, the theoretical reversible hydrogen capacity is 6.3 wt %, whereas its actual hydrogen capacity is 6.8 wt %. At 14 mol % $LiNH_2$, its theoretical reversible hydrogen capacity is 6 wt %, whereas its actual hydrogen capacity is 6.6 wt %. Without desiring to be bound by theory, it is thought that the higher-than-predicted reversible hydrogen capacity implies that in addition to the hydrogen produced through the first-dehydrogenation-step ($LiH+LiNH_2=Li_2NH+H_2$), additional reversible hydrogen is generated through the second-hydrogenation-step ($LiH+Li_2NH=Li_3N+H_2$).

The $LiNH_2$ can be conveniently incorporated into the solid by combining powdered $Li_3N$ and $LiNH_2$ prior to the oxidation step. However, if desired, the powders may be combined after or during surface oxidation of the $Li_3N$ powder.

The solid prepared by the method of the present invention has been found to maintain stability, hydrogen capacity and reversible storage capability at temperatures as high as 400° C. At higher temperatures, the medium can become chemically unstable, and the hydrogen capacity and storage reversibility may be reduced. It should also be noted that with decreasing temperature, the release of hydrogen from the medium generally decreases in thermodynamic favorability. As a result, at room temperature, medium which contains hydrogen can retain it for times on the order of years.

A conventional method for measuring hydrogen capacity of a solid is thermogravimetry, which determines the hydrogen capacity of a sample via weight change. The sample is usually kept in a $H_2$ flow for a certain time to determine the weight change. However, with thermogravimetry, even a $H_2O$ impurity concentration as low as several ppm can lead to a significant error because the weight of a $H_2O$ molecule is equal to the weight of 9 $H_2$ molecules. Because of the continuous stream of $H_2$ employed in this method, sample can adsorb a significant amount of $H_2O$, particularly in small samples and during long-time measurements. For example, 0.5 wt % $H_2O$ adsorbed can be misinterpreted as 4.5 wt % hydrogen capacity.

In contrast, the volumetric method measures the hydrogen capacity by measuring the pressure change of $H_2$ during absorption in a closed chamber. As a result, the adsorption of $H_2O$ leads to less than 0.01 wt % error in the hydrogen capacity in the volumetric method.

EXAMPLE 1

The following tests demonstrate the superior hydrogen capacity, stability and reversibility of the medium provided by the present invention. $Li_3N$ was first partially oxidized by its exposure for 30 min to air to absorb $H_2O$, followed by heating in vacuum to 230° C. for the decomposition of Li—$H_2O$ to $Li_2O$ and $H_2$. Then, the material was pretreated with hydrogen at 230° C. for at least 48 h and dehydrogenated at 280° C. for 24 h to ensure re-arrangements in $Li_3N$. The obtained material is denoted as Li—N—O.

Figure 2:
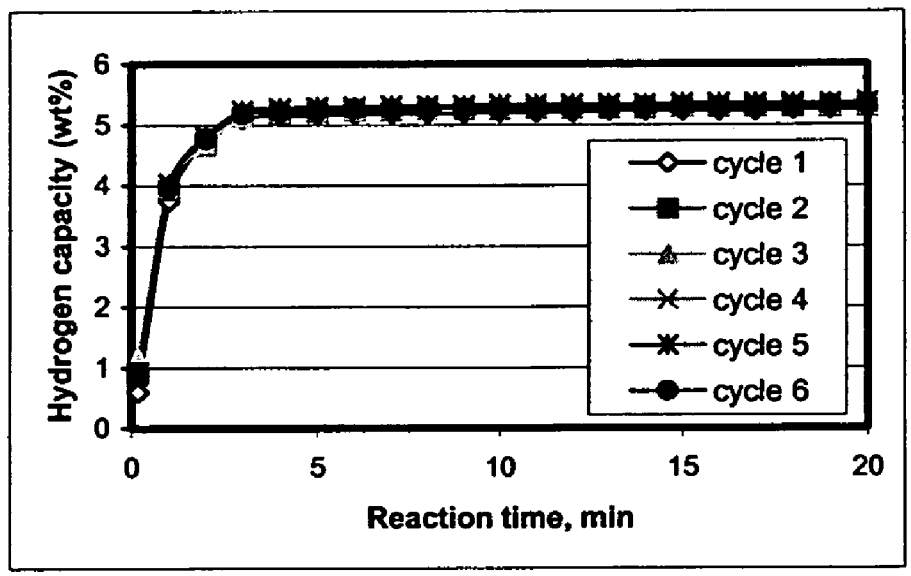
FIG. 2. The stability of Li—N—O for $H_2$ absorption at 198° C. Conditions: initial pressure 7 atm and final pressure 4 atm, $Li_3N$=0.25 g.
Figure 3:
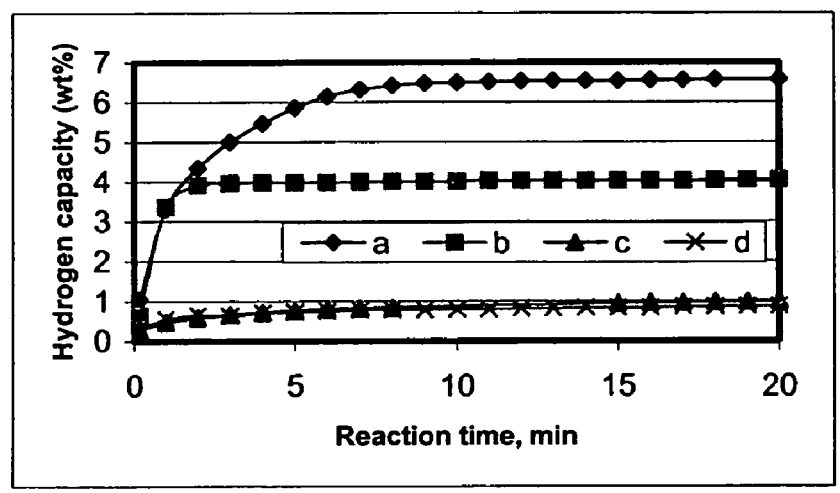
FIG. 3. Hydrogen absorption versus reaction time at 198° C. and 7 atm (initial pressure): (a)the first absorption by fresh $Li_3N$ without any treatment; (b)the second absorption after desorption; (c) hydrogen absorption of $Li_3N$ treated by hydrogenation-dehydrogenation at 230° C.; (d) hydrogen absorption by the $Li_3N$ partially oxidized by its exposure to air for 30 min, followed by heating to 200° C. in vacuum.

As shown in FIG. 1, the Li—N—O material could reach 5 and 5.2 wt % hydrogen capacities in only 3 min at 180° C. and 198° C., respectively. Furthermore, we found that during 6 absorption-desorption cycles, the absorption curves coincided with each other at 198° C. (FIG. 2). This indicates that the Li—N—O material possesses not only an ultra-fast kinetics but also a high stability for hydrogen storage. In contrast, at the same pressure, we found that magnesium, which is the best-known metal for hydrogen storage, can hardly absorb any $H_2$ at temperatures below 300° C. Furthermore, as shown in FIG. 3, although the fresh pure $Li_3N$ could absorb initially 6.5 wt % hydrogen, the hydrogen-capacity dropped to 4 wt % during the second absorption after the first cycle. This indicates that the pure $Li_3N$ has a low stability. FIG. 3 also shows that, for either the pure $Li_3N$ pretreated by prehydrogenation-dehydrogenation or the partially oxidized $Li_3N$ without the prehydrogenation-dehydrogenation pretreatment, the hydrogen absorption was as low as 1 wt % at 198° C. This indicates that the combination of the partial oxidation with the hydrogenation-dehydrogenation pretreatment can make $Li_3N$ active and stable for hydrogen absorption.

EXAMPLE 2

Figure 4:
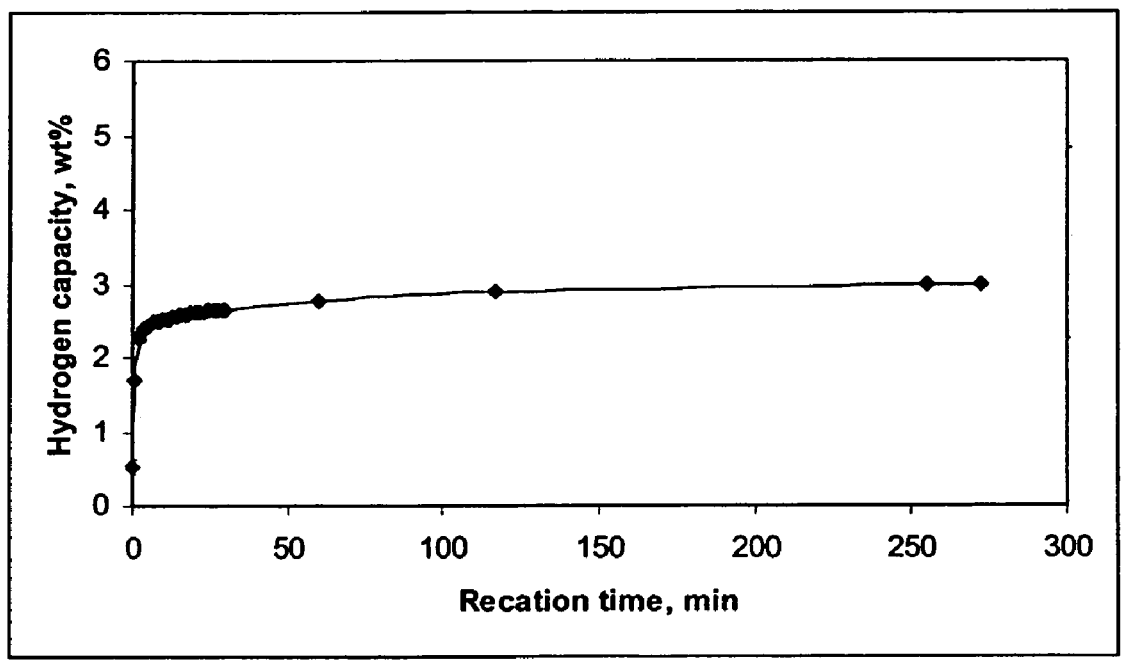
FIG. 4. Hydrogen absorption by $Li_3N$ which is oxidized in wet-air for more than 2 hours, followed by decomposition and prehydrogenation-dehydrogenation treatment. Conditions: initial pressure is 7 atm, temperature is 250° C.

This example demonstrates that the reversible hydrogen capacity depends on the amount of $Li_2O$ formed in the oxidation step. For example, in our experiments, it was found that 0.5 hours of exposure to air resulted in a suitable amount of $Li_2O$. However, too much oxidation caused by longer-time oxidations can give a relatively low reversible hydrogen capacity. As shown in the FIG. 4, when the exposure time in air was 2 hours, the reversible hydrogen capacity of the obtained material was only 3 wt % even at 250° C., which is much lower than that of the material with the exposure time of 0.5 h (5.2 wt %). The parameters for the experiment depicted in FIG. 4 are as follows: $Li_3N$ was first partially oxidized by its exposure to air to absorb $H_2O$ for 2 h, followed by heating in vacuum to 230° C. for the decomposition of Li—$H_2O$ to $Li_2O$ and $H_2$. The material was then pretreated with hydrogen at 230° C. for at least 48 h and dehydrogenated at 280° C. for 24 h to ensure the dispersion of $Li_2O$.

EXAMPLE 3

$LiNH_2/Li_3N$ mixtures with various $LiNH_2/Li_3N$ molar ratios were prepared by mixing powders of $LiNH_2$ and $Li_3N$ (about 80 mesh) with an agate mortar and pestle, by hand, in air for 5 min. The grinding of the sample in air (at room temperature) generated a small amount of LiOH on the surface layer of the sample. This was followed by its decomposition to $Li_2O$ on the surface layer of $Li_3N$ by heating in vacuum at 230° C. Furthermore, the sample was subjected to an in-situ prehydrogenation (at 230° C. for 24 h), followed by dehydrogenation (at 280° C. for 12 h) before the reversible hydrogen storage measurements. For comparison purposes, $Li_3N$ free of added $LiNH_2$, the mechanical mixture of $LiH/LiNH_2$ (1:1), and the decomposed $LiNH_2$, were also employed as hydrogen storage materials, and subjected to thee grinding, decomposition and hydrogenation-dehydrogenation pretreatment.

EXAMPLE 4

Figure 5:
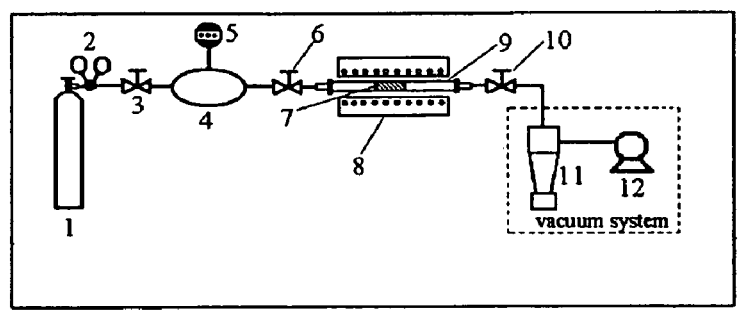
FIG. 5. Volumetric measurement unit (1. $H_2$ cylinder; 2. regulator; 3. cut-off valve; 4. reservoir container; 5. digital pressure gauge; 6. cut-off valve; 7. sample; 8. furnace; 9. reactor; 10. cut-off valve; 11. diffusion pump; 12. mechanical pump).

To accurately examine the hydrogen absorption by $LiNH_2/Li_3N$, we have employed a volumetric method (FIG. 5), which can be described as follows: A solid storage material (0.25 g) was loaded in a reactor located inside an electrical tube furnace. The reservoir 4 was filled with $H_2$. The pressure of $H_2$ in the reservoir was determined by a digital pressure gauge with two cut-off valves closed at both ends of the reservoir. The cut-off valve 6 between reservoir and reactor containing the sample was opened to allow the $H_2$ into the reactor, which was heated to a selected temperature. The change in the gas phase $H_2$ during absorption was measured using the digital pressure gauge 5. To examine the effect of the hydrogen absorption-desorption cycles, the hydrogenated sample was exposed to vacuum to desorb the hydrogen at 230° C. for 3-12 h, followed by re-absorption. An on-line mass spectrometer was used to confirm that, except hydrogen, no other compounds were present during hydrogenation and dehydrogenation. The reversible hydrogen capacity was determined as the amount of hydrogen absorbed after the sample was subjected to the hydrogenation-dehydrogenation pretreatment. The hydrogen capacity is defined as the percentage of hydrogen absorbed based on the total weight of the solid sample before any treatment.

However, in the volumetric method, one must ensure that the unit is free of leakage. Leakage test experiments showed that the pressure change in the volumetric equipment used was 0.1 psi over 10 hours, which is equivalent to 0.02 wt % hydrogen capacity for 0.25 g storage material.

Figure 6:
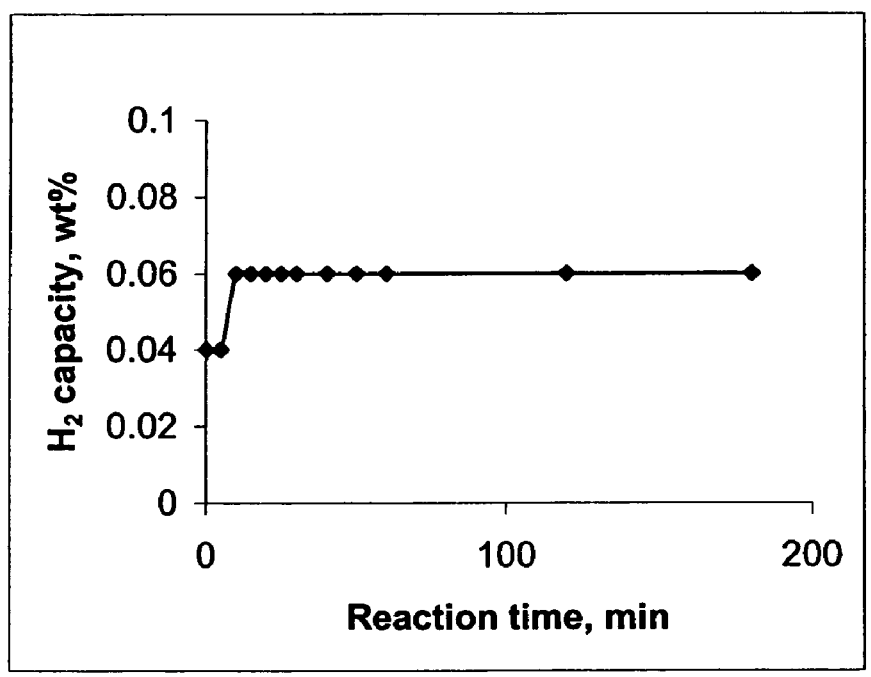
FIG. 6. Blank experiment for hydrogen storage when 0.25 g quartz wool at 230° C. and 7 atm (initial hydrogen pressure) was employed.

The equipment error was determined by running "blank" experiments in which in our blank experiments 0.25 g quartz wool, was used in the volumetric test unit rather than hydrogen storage material. Because the quartz wool can not absorb hydrogen, its measured "hydrogen capacity" is equal to the equipment error. The measured hydrogen capacity at 230° C. and 7 atm was 0.06 wt % (see FIG. 6), an error which is small relative to the hydrogen storage effects to be measured.

EXAMPLE 5

Figure 7:
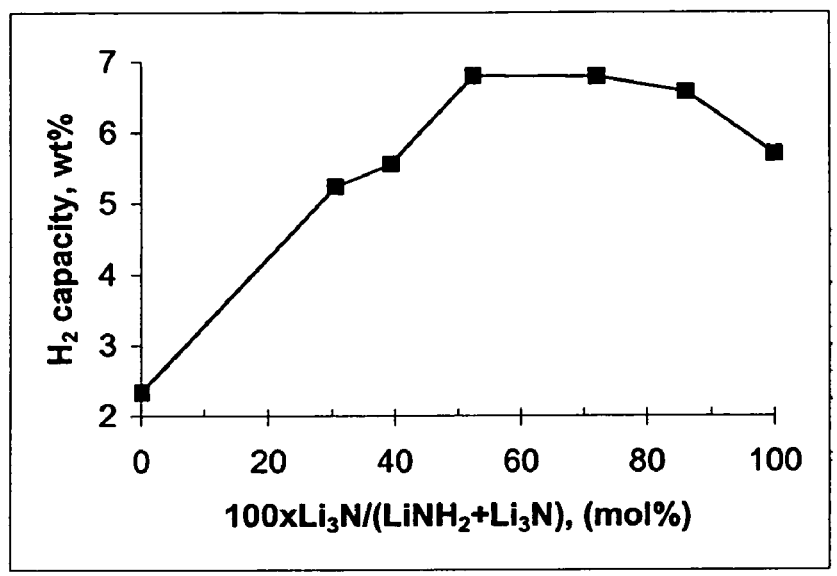
FIG. 7. Effect of composition on reversible hydrogen capacity at 230° C. and 7 atm of initial hydrogen pressure (the samples were subjected to a hydrogenation-dehydrogenation pretreatment before the determination of the reversible hydrogen capacity). The horizontal axis is in mol % of added $LiNH_2$ relative to the weight of the solid ($LiNH_2$+$Li_3N$).

The reversibility of the hydrogen storage capacity of $LiNH_2/Li_3N$ was determined by the volumetric method at 230° C. as described in Example 4. As shown in FIG. 7, the reversible hydrogen capacity of the solid was strongly dependent upon its composition. When the $LiNH_2$ was added in amounts above 50 mol % of the weight of the solid, the amount of reversible hydrogen increased with increasing $Li_3N$ content. When the amount of added $LiNH_2$ was less than 50 mol %, but larger than 28 mol %, the reversible hydrogen capacity remained almost constant at 6.8 wt %. Even for 14 mol % $LiNH_2$, the reversible hydrogen capacity could still reach 6.6 wt %. The reversible hydrogen capacity of $Li_3N$ free of added $LiNH_2$ was 5.7 wt %. According to theoretical calculations based on the assumption that the reversible hydrogen was generated just via the first step ($LiH+LiNH_2=Li_2NH+H_2$), the highest reversible hydrogen capacity should be 6.85 wt %, which can be reached only when $Li_3N$ is mixed with $LiNH_2$ at a mole ratio of 1:1, because at this composition, the total number of moles of $LiNH_2$ added plus generated during the $Li_3N$ hydrogenation becomes equal to the number of moles of LiH generated through $Li_3N$ hydrogenation. However, the experimental results differed from this theoretical prediction. When $Li_3N$ was mixed with 28 mol % $LiNH_2$, the theoretical reversible hydrogen capacity was 6.3 wt %, whereas its real capacity was 6.8 wt %. Furthermore, when $Li_3N$ was mixed with 14 mol % $LiNH_2$, its theoretical reversible hydrogen capacity was 6 wt %, whereas the real one was 6.6 wt %. The higher reversible hydrogen capacity than predicted implies that besides the hydrogen produced through the first-dehydrogenation-step ($LiH+LiNH_2=Li_2NH+H_2$), additional reversible hydrogen was generated through the second-hydrogenation-step ($LiH+Li_2NH=Li_3N+H_2$).

Figure 8:
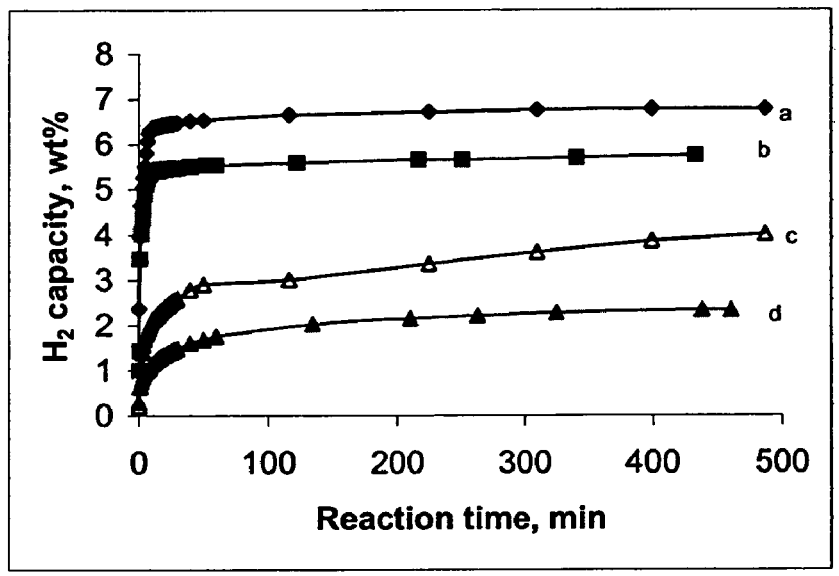
FIG. 8. Comparison between various samples for hydrogenation at 230° C. and 7 atm (initial hydrogen pressure): (a). 28 mol % $HNH_2/Li_3N$ previously subjected to a hydrogenation-dehydrogenation cycle; (b). $Li_3N$ previously subjected to a hydrogenation-dehydrogenation cycle; (c). LiH/$LiNH_2$ (1:1) mixture; (d). dehydrogenated $LiNH_2$ in vacuum at 280° C. for 12 h.

As shown in FIG. 8, a 28 mol % $LiNH_2/Li_3N$ mixture absorbed 6.0 wt % hydrogen in only 7 min at 230° C. After 40 min, the hydrogen capacity became 6.5 wt % and finally 6.8 wt %. In contrast, under the same reaction conditions, $LiNH_2$ free of $Li_3N$, which was previously subjected to dehydrogenation in vacuum at 280° C. for 12 h, could just achieve 1 wt % reversible hydrogen capacity in 7 min and a final capacity of only 2.3 wt %. Furthermore, although $Li_3N$ free of added $LiNH_2$ has a faster absorption rate and a higher hydrogen capacity than $LiNH_2$ free of $Li_3N$ (about 2 wt % capacity) and the mechanical mixture of $LiH/LiNH_2$ (1:1) (about 3.8 wt % capacity), its hydrogen capacity is still lower than that of the $LiNH_2$-added $Li_3N$. This indicates that the $LiNH_2$ with added $Li_3N$ has both high reversible hydrogen capacity and fast absorption kinetics.

Figure 9:
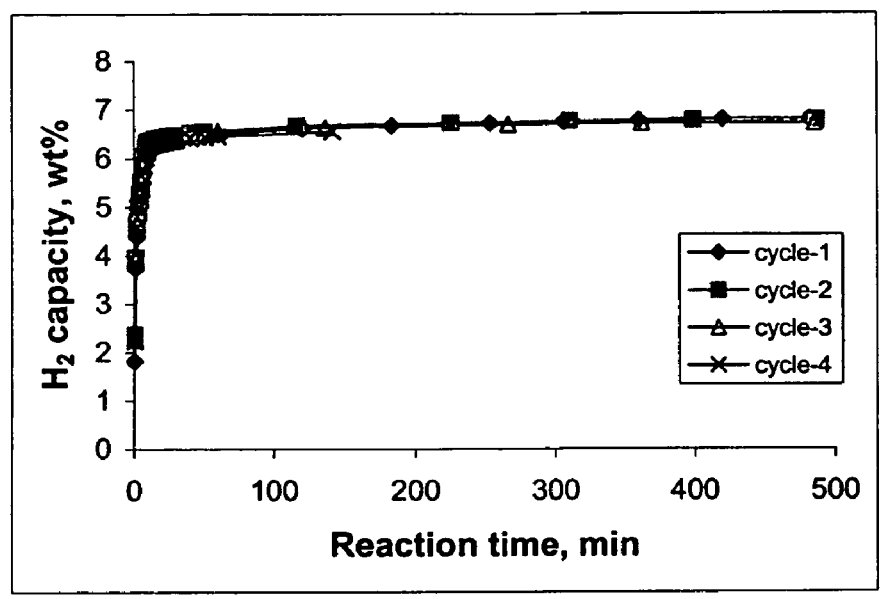
FIG. 9. Effect of cycles on reversible hydrogen capacity in a $LiNH_2/Li_3N$ solid (28 mol % added $LiNH_2$) at 230° C. and 7 atm of initial hydrogen pressure.
Figure 10:
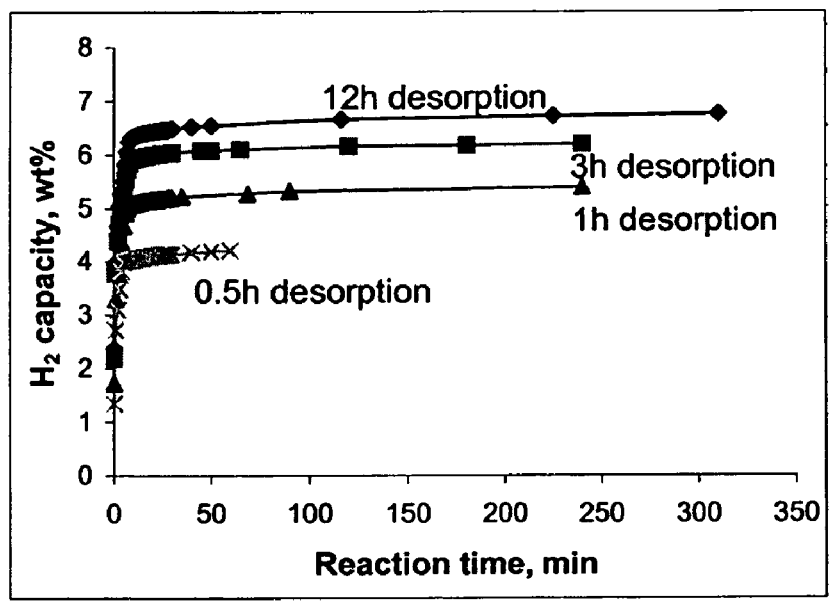
FIG. 10. Rehydrogenation of a $LiNH_2/Li_3N$ solid (28 mol % added $LiNH_2$) at 230° C. and 7 atm of initial hydrogen pressure (after 0.5, 1, 3, and 12 h dehydrogenation of hydrogenated $LiNH_2$—$Li_3N$, at 230° C., respectively).

Usually, the low reversibility is a critical issue for most hydrogen storage materials. However, one can see from FIG. 9 that, during 4 absorption-desorption cycles, the absorption curves coincided with each other. This observation shows that $LiNH_2$-added $Li_3N$ has a high stability for hydrogen storage. Furthermore, we also evaluated the dehydrogenation by determining the rehydrogenation. FIG. 10 shows that 62% of the total reversible hydrogen could desorb in only 30 min and near 80% after 60 min from the hydrogenated $LiNH_2$-added $Li_3N$. This indicates that this material has also a reasonable dehydrogenation kinetics.

While this invention has been described through specific embodiments, routine modifications will be apparent to those skilled in the art and such modifications are intended to be within the scope of the present invention.

REFERENCES

1. W. Grochala, P. P. Edwards, Thermal Decomposition of the non-Interstitial Hydrides for the Storage and Production of Hydrogen, *Chem. Rev.,* 2004, 104, 1283.
2. M. L. Trudeau, Advanced materials for energy storage, *MRS Bulletin,* 1999, 24, 23.
3. J. Genossar, and P. S. Rudman, Catalytic role of $Mg_2Cu$ in the hydriding and dehydriding of Mg, *Z.f. Phys. Chem., Neue Folge* 1979, 116, 215.
4. R. Wiswall, in G. Alefeld and J. Völkl (eds.), *Hydrogen in Metals II*, Springer-Verlag, 1978, p. 201.
5. B. Bogdanovic, M. Schwickardi, Ti-doped alkali metal aluminium hydrides as potential novel reversible hydrogen storage materials, Catalyzed complex metal hydrides, *J. Alloys Comp.* 1997, 253, 1.
6. B. Bogdanovic and G. Sandrock, Catalyzed complex metal hydrides, *MRS Bulletin,* 2002, 27, 712.
7. K. J. Gross, G. J. Thomas and C. M. Jensen, Catalyzed alanates for hydrogen storage, *J. Alloys Comp.* 2002, 330, 683.
8. A. C. Dillon, K. M. Jones, T. A. Bekkedahl, C. H. Kiang, D. S. Bethuune and M. J. Heben, Storage of hydrogen in single-walled carbon nanotubes, *Nature,* 1997, 386, 377.
9. Y. Ye, C. C. Ahn, C. Witham, B. Fultz, J. Liu, A. G. Rinzler, D. Colbert, K. A. Smith, and R. E. Smalley, Hydrogen adsorption and cohesive energy of single-walled carbon nanotubes, *Appl. Phys. Lett.,* 1999, 74, 2307.
10. C. Liu, Y. Y. Fan, H. M. Cheng and M. S. Dresselhaus, Hydrogen storage in single-walled carbon nanotubes at room temperature, *Science* 1999, 286, 1127.
11. M. Hirscher, M. Becher, M. Haluska, U. Dethlaff-Weglikowska, A. Quintel, G. S. Duesberg, Hydrogen storage in sonicated carbon materials, *Appl. Phys. A.* 2001, 72, 129.
12. M. S. Dresselhaus, K. A. Williams, and P. C. Eklund, Hydrogen adsorption in carbon materials, *MRS Bulletin,* 1999, 24, 45.
13. R. Ma, Y. Bando, H. Zhu, T. Sato, C. Xu, and D. Wu, Hydrogen Uptake in Boron Nitride Nanotubes at Room Temperature, *J. Amer. Chem. Soc.,* 2002, 124, 7672.
14. J. Chen, N. Kuriyama, H. Yuan, H. T. Takeshita, and T. Sakai, Electrochemical Hydrogen Storage in $MoS_2$ Nanotubes, *J. Amer. Chem. Soc.,* 2001, 123, 11813.

15. J. Chen, S. L. Li, Z. L. Tao, Y. T. Shen, and C. X. Cui, Titanium Disulfide Nanotubes as Hydrogen-Storage Materials, *J. Amer. Chem. Soc.*, 2003, 125, 5284.
16. R. T. Yang, Hydrogen storage by alkali-doped carbon nanotubes-revisited, *Carbon*, 2000, 38, 623.
17. N. L. Rosi, J. Eckert, M. Eddaoudi, D. T. Vodak, J. Kim, M. O'Keefe, O. M. Yaghi, Hydrogen storage in microporous metal-organic frameworks, *Science*, 2003, 300, 1127.
18. (a). Y. H. Hu, and E. Ruckenstein, Ultrafast reaction between LiH and $NH_3$ during $H_2$ storage in $Li_3N$, *J. Phys. Chem. A,* 2003, 107, 9737. (b). Y. H. Hu, E. Ruckenstein, "Highly effective $Li_2O/Li_3N$ with Ultra-fast kinetics for $H_2$ storage", *Ind. Eng. Chem. Res.*, 2004, 43, 2464; (c). Y. H. Hu and E. Ru ckenstein, Temperature-programmed hydrogenation and dehydrogenation, *Ind. Eng. Chem. Res.*, 2003, 42, 5135.
19. (a). T. Ichikawa, S. Isobe, N. Hanada, H. Fujii, Lithium nitride for reversible hydrogen storage, *J. Alloys Comp.*, 2004, 365, 271; (b) T. Ichikawa, N. Hanada, S. Isobe, H. Y. Leng, H. Fujii, Mechanism of novel reaction from $LiNH_2$ and LiH to $Li_2NH$ and $H_2$ as a promising hydrogen storage, *J. Phys. Chem. B.* 2004, 108, 7887; (c). H. Y. Leng, T. Ichikawa, S. Hino, N. Hanada, S. Isobe, H. Fujii, New metal-N-H system composed of $Mg(NH_2)_2$ and LiH for hydrogen storage, *J. Phys. Chem., B,* 2004, 108, 8763.
20. Y. Nakamori and S. Orimo, "Li—N based hydrogen storage materials", *Mater. Sci. Eng. B,* 2004, 108, 48.
21. Y. H. Hu, N. Y. Yu, and E. Ruckenstein, "Effect of pre-treatments on hydrogen storage in $Li_3N$-based materials", *Ind. Eng. Chem. Res.* 2004, 43, 4174.
22. F. W. Dafert, and R., Miklauz, New compounds of nitrogen and hydrogen with lithium, *Monatsh. Chem.* 1910, 31, 981.
23. O. Ruff, and H. Goeres, Li imide and some compounds of N, H and Li, *Ber.,* 1910, 44, 502.

We claim:

1. A method for producing a high hydrogen storage capacity solid comprising $Li_3N$, said method comprising the steps of:
    a) subjecting a portion of the surface of said solid to oxidation;
    b) at least partially hydrogenating the solid from a);
    c) at least partially dehydrogenating the solid from b).

2. A method as in claim 1 wherein said solid is formed by a method comprising mixing powdered $Li_3N$ and powdered $LiNH_2$ in a mol % in the range of from 0.5 mol $Li_3N$ per mole of $LiNH_2$ to 99 mol $Li_3N$ per mole of $LiNH_2$.

3. A method as in claim 2 wherein the combined weight of $Li_3N$ and $LiNH_2$ in the solid is at least 80 weight %.

4. A method as in claim 3 wherein upon hydrogenation, said solid increases in weight to a hydrogenated weight which is at least 2 wt % more than its weight prior to hydrogenation.

5. A method as in claim 4 wherein upon dehydrogenation, said solid decreases to a weight which is 2 wt % less than its hydrogenated weight.

6. A method as in claim 1 wherein the oxidation in step a) comprises forming LiOH; and converting at least part of said LiOH to $Li_2O$.

7. A method as in claim 1 wherein said $Li_3N$ is in powdered form, and LiOH is formed on the surface of the powder particles.

8. A method as in claim 7 wherein the powder comprises particles which are in the range of from 1 nm to 10 mm in diameter.

9. A method as in claim 2 wherein said $Li_3N$ and the $LiNH_2$ are in powdered form, and LiOH is formed on the surface of the powder particles.

10. A method as in claim 9 wherein the powdered $Li_3N$ and powdered $LiNH_2$ comprise particles which are in the range of from 1 nm to 10 mm in diameter.

11. A solid comprised of $Li_3N$ which has a hydrogen storage capacity of at least 5.0 wt percent, said solid further comprising $Li_2O$, wherein said $Li_3N$ is in powdered form, and at least some of said $Li_2O$ is on the surface of the powder particles.

12. A solid as in claim 11 wherein the solid has a hydrogen storage capacity of at least 5.2 wt percent.

13. A solid as in claim 12 which additionally comprises $LiNH_2$.

14. A solid as in claim 11 wherein upon hydrogenation, said solid increases in weight to a hydrogenated weight which is at least 2 wt % more than its weight prior to hydrogenation.

15. A solid as in claim 11 wherein upon dehydrogenation, said solid decreases to a weight which is 2 wt % less than its hydrogenated weight.

16. A solid as in claim 13 wherein upon hydrogenation, said solid increases in weight to a hydrogenated weight which is at least 3 wt % more than its weight prior to hydrogenation.

17. A solid as in claim 13 wherein upon dehydrogenation, said solid decreases to a weight which is 3 wt % less than its hydrogenated weight.

18. A solid as in claim 12 wherein the solid has a hydrogen storage capacity of at least 6.0 wt percent.

19. A solid as in claim 13 wherein said $Li_3N$ and $LiNH_2$ are in powdered form, and LiOH is formed on the surface of the powder particles.

20. A solid as in claim 11 wherein the powder comprises particles which are in the range of from 1 nm to 10 mm in diameter.

* * * * *